United States Patent [19]
Kakugo et al.

[11] Patent Number: 4,769,284
[45] Date of Patent: Sep. 6, 1988

[54] POLYPROPYLENE MULTI-LAYER FILM

[75] Inventors: Masahiro Kakugo, Narashino; Seiichiro Ima, Ichihara; Tatsuya Miyatake, Ichihara; Hiroyuki Harada, Ichihara, all of Japan

[73] Assignee: Sumitomo Chemical Company, Limited, Osaka, Japan

[21] Appl. No.: 854,803

[22] Filed: Apr. 23, 1986

[30] Foreign Application Priority Data

Apr. 26, 1985 [JP] Japan .................................. 60-91969

[51] Int. Cl.$^4$ ............................................ B32B 27/00
[52] U.S. Cl. ..................................... 428/349; 428/516
[58] Field of Search ................. 428/349, 516; 525/240

[56] References Cited

U.S. PATENT DOCUMENTS 4,125,662  11/1978  Weiner ................. 428/349
4,339,496  7/1982  Weiner ................. 428/349

FOREIGN PATENT DOCUMENTS 14233  1/1980  Japan .
58861  5/1981  Japan .

Primary Examiner—Edith Buffalow
Attorney, Agent, or Firm—Stevens, Davis, Miller & Mosher

[57] ABSTRACT

A polypropylene multi-layer film which comprises a substrate layer formed of crystalline polypropylene and a composition laminated on at least one side of said substrate layer, said composition comprising 70 to 95% by weight of (A) a crystalline propylene-ethylene copolymer having an ethylene content of 1.5 to 6.0% by weight and/or a crystalline propylene-α-olefin copolymer having a propylene content of 80 to 98% by weight, a butene-1 content of 2 to 20% by weight, and an ethylene content of 0 to 5% by weight, and 5 to 30% by weight of (B) a crystalline propylene-butene-1 copolymer which is a copolymer obtained by decomposing a crystalline propylene-butene-1 copolymer having a butene-1 content of 25 to 45% by weight, an intrinsic viscosity of 2.5 dl/g or more as determined in tetralin at 135° C., and a proportion of 35% by weight or more of a polymer component soluble in xylene at 20° C., and containing 1.5% by weight or less of a polymer component having a molecular weight calculated in terms of polystyrene of 10,000 or less as determined by GPC.

11 Claims, No Drawings

POLYPROPYLENE MULTI-LAYER FILM

BACKGROUND OF THE INVENTION

1. Field of the Invention

This invention relates to a polypropylene multi-layer film having an improved low-temperature heat sealing characteristic. More particularly, it relates to a polypropylene multi-layer film having improved heat sealing property, resistance to solvent extraction and other film properties, and particularly suited to food packaging, which film comprises a substrate layer formed of crystalline polypropylene and a composition laminated thereon, said composition comprising a general purpose crystalline propylene-α-olefin copolymer having unsatisfactory low-temperature heat sealing property and a relatively small amount of a specified crystalline propylene-butene-1 copolymer incorporated thereto.

2. Description of the Prior Art

Stretched film of crystalline polypropylene is excellent in mechanical strength such as tensile strength, rigidity and low-temperature resistance, optical properties such as gloss and transparency, and food hygienic properties such as innoxiousness and odorlessness, and hence is widely used in the field of packaging including food packaging.

However, said polypropylene stretched film used as a single layer has a defect in that it has an extremely poor heat sealing property and, if forcibly heat sealed, undergoes thermal shrinkage, resulting in deterioration of the appearance of the product, so that the heat sealing is virtually impossible.

Various attempts have been made to obviate the above-mentioned defect. A widely used method among them is to use a multi-layer film formed by laminating on a substrate of polypropylene a resin layer having a low-temperature heat sealing property superior to that of the substrate. In such a method, multi-layer film formed by laminating, as a resin of superior heat sealing property, polyethylene, ethylene-vinyl acetate copolymer, or the like has a defect in that though it is excellent in heat sealing property it shows deteriorated transparency and scratch resistance. On the other hand, for the purpose of obviating such a defect, there have been proposed multi-layer films having laminated therein propylene-ethylene copolymer of an ethylene content of about 0.5 to 5% by weight [Japanese Patent Application Kokoku (Post-Exam. Publication) No. 31478/71], propylene-ethylene-butene-1 terpolymer [Japanese Patent Application Kokai (Laid-open) No. 35487/74], and propylene-α-olefin copolymer having a content of α-olefin of 4 or more carbon atoms of 5 to 20% by weight [Japanese Patent Application Kokai (Laid-open) No.128781/75]. However, although these multi-layer films are excellent in transparency and scratch resistance, their low-temperature heat sealing propertry is not sufficiently good, and resultantly their aptitude for high speed packaging, etc. is unsatisfactory.

Accordingly, a number of attempts have been made to improve the low-temperature heat realing property while maintaining the good characteristics of stretched polypropylene film such as transparency and scratch resistance as much as possible. For example, Japanese Patent Application Kokai (Laid-open) No. 14223/80 discloses "a stretched composite polypropylene film which comprises a stretched crystalline polypropylene layer and a composition (A) laminated on at least one side of said layer, said composition (A) comprising 3 to 97% of an ethylene-propylene random copolymer having an ethylene content of 1 to 10% by weight, and 3 to 97% by weight of a propylene-α-olefin or propylene-α-olefinethylene copolymer having a propylene content of 65 to 99% by weight, a content of α-olefin of 4 to 8 carbon atoms of 1 to 30% by weight and an ethylene content of 0 to 5% by weight". Japanese Patent Application Kokai (Laid-open) No. 58861/81 discloses "a polypropylene composite film which comprises a substrate layer formed of an isotactic polypropylene layer and a polyolefin composition laminated on at least one side of the said substrate layer, said polyolefin composition comprising 10 to 40% by weight of a propylene-butene-1 random copolymer having a propylene content of 55 to 80% by weight and a heat of crystal fusion of 20 to 80 Joule/g as determined by thermal analysis on a differential scanning calorimeter, and 90 to 60% by weight of a crystalline propylene-α-olefin random copolymer having a propylene content of 99 to 93% by weight.

However, these attempts of improving the low-temperature heat sealing property by incorporation of crystalline propylene-butene-1 copolymer disclosed above all give, to the best of the knowledge of present inventors, only unsatisfactory products because they have defects in that they are unsatisfactory in low-temperature heat sealing property, or, when their low-temperature heat sealing property is on an approximately satisfactory level, they show deterioration in properties important to packaging film, such as blocking resistance and solvent resistance. Thus, there have been serious problems in that when the amount of soft resin, which is a crystalline propylene-butene-1 copolymer, added for improving the low-temperature heat sealing property is a relatively small value of 30% by weight or less, although scratch resistance, etc. of the resultant film are usually maintained on a good level, its low-temperature heat sealing property is poor; whereas when the added amount of soft resin is 40% by weight or more, although the low-temperature heat sealing property is satisfied in the main, the film is poor in important properties including scratch resistance.

SUMMARY OF THE INVENTION

The object of this invention is to provide a polypropylene multi-layer film which can solve the above-mentioned problems, is excellent in low-temperature heat sealing property, and further is excellent in packaging film properties including scratch resistance, blocking resistance and solvent resistance.

In a view of the above-mentioned problems of previous polypropylene multi-layer film, the present inventors have made extensive studies aiming at obtaining a product in which the amount of soft resin to be compounded is 30% by weight or less, preferably 25% by weight or less, and which has a practical heat sealing temperature (a temperature at which the seal strength per 25 mm of seal width reaches 250 g) of 100° C. or less and also has excellent film properties including scratch resistance, blocking resistance and solvent resistance. As the result, it has been found that the intended polypropylene multi-layer film can be obtained by using a specified crystalline propylene-butene-1 copolymer as the above-mentioned soft resin. The present invention has been attained on the basis of the above finding.

Thus, this invention relates to a polypropylene multi-layer film which comprises a substrate layer formed of crystalline polypropylene and a composition laminated on at least one side of said substrate layer, said composition comprising 70 to 95% by weight of (A) a crystalline propylene-ethylene copolymer having an ethylene content of 1.5 to 6.0% by weight and/or a crystalline propylene-α-olefin copolymer having a propylene content of 80 to 98% by weight, a butene-1 content of 2 to 20% by weight and an ethylene content of 0 to 5% by weight, and 5 to 30% by weight of (B) a crystalline propylene-butene-1 copolymer which is a copolymer obtained by decomposing a crystalline propylene-butene-1 copolymer having a butene-1 content of 25 to 45% by weight, an intrinsic viscosity of 2.5 dl/g or more as determined in tetralin at 135° C., and a proportion of 35% by weight or more of a polymer component soluble in xylene at 20° C. and which contains 1.5% by weight or less of a polymer component having a molecular weight calculated in terms of polystyrene of 10,000 or less as determined by GPC.

DETAILED DESCRIPTION OF THE INVENTION

The crystalline polypropylene to be used in this invention is solid at ordinary conditions, contains 80% by weight or more of a boiling n-heptane isoluble portion, has an intrinsic viscosity of 1.3 to 4.2 dl/g, and contains at least 95% by weight of propylene in the polymer chain. Copolymers containing 5% by weight or less of ethylene and/or butene-1 can also be used.

When the crystalline propylene-α-olefin copolymer (A) used in this invention is propylene-ethylene copolymer, its ethylene content is in the range of 1.5 to 6.0% by weight, preferably 2.5 to 5.5% by weight. When the copolymer (A) is propylene-ethylene-butene-1 copolymer or propylene-butene-1 copolymer, the range of the content of propylene is 80 to 98% by weight, that of ethylene is 0 to 5% by weight and that of butene-1 is 2 to 20% by weight; preferably the propylene content is 85 to 98% by weight, the ethylene content is 0 to 4% by weight and the butene-1 content is 2 to 15% by weight. More preferably, when the copolymer is propylene-ethylene-butene-1 copolymer, the ethylene content is 1.0 to 3.5% by weight and butene-1 content is 2.5 to 9.0% by weight; when it is propylene-butene-1 copolymer, the butene-1 content is 5 to 15% by weight. When the comonomer content is lower than the above-mentioned range, the effect of improving the heat sealing property is insufficient, whereas when the comonomer content is higher than the above-mentioned range, scratch resistance, blocking resistance and solvent resistance are deteriorated.

The object of this invention can be achieved when the contents of propylene, ethylene and butene-1 in the crystalline propylene-α-olefin copolymer (A) are in the above-mentioned range for respective copolymers. If desired, the respective copolymers of the above-mentioned comonomer content ranges may be compounded in an appropriate proportion.

The crystalline propylene-α-olefin copolymer (A) has preferably a melt flow index determined according to JIS K6758 in the range of 1 to 30, particularly 3 to 20. The crystalline propylene-α-olefin copolymer (A) can be prepared, for example, by a method disclosed in Japanese Patent Application Kokai (Laid-open) No. 162785/79 or 3443/80.

The crystalline propylene-butene-1 copolymer (B) used in this invention is a copolymer which is obtained by decomposing a crystalline propylene-butene-1 copolymer before decomposition (hereinafter referred to as predecomposition copolymer) having a butene-1 content of 25-45% by weight, an intrinsis viscosity of 2.5 dl/g or more as determined in tetralin at 135° C., and a proportion of a polymer component soluble in xylene at 20° C. (said proportion being hereinafter referred to as CXS) of 35% by weight or more, and which contains 1.5% by weight or less of a polymer component having a molecular weight calculated in terms of polystyrene of 10,000 or less (said component having hereinafter referred to as "component of MW of 10,000 or less").

Pre-decomposition copolymers having a butene-1 content of less than 25% by weight are unsuitable because they give an insufficient effect in improving the low-temperature heat sealing property, whereas those having a butene-1 content exceeding 45% by weight are unsuitable because they give an insufficient effect in improving the low-temperature heat sealing property, or cause deterioration of scratch resistance, blocking resistance, and the like. A more preferable range of butene-1 content is 27 to 40% by weight.

The pre-decomposition copolymer should have an intrinsic viscosity of 2.5 dl/g or more. Those having an intrinsic viscosity of less than 2.5 dl/g gave an insufficient effect in improving low-temperature heat sealing property. The preferred range of the intrinsic viscosity is 2.7 to 5.5 dl/g. When the pre-decomposition copolymer has CXS of less than 35% by weight it gives an insufficient effect in improving low-temperature heat sealing property. Said CXS is preferably 43% by weight or more.

The extent of decomposition in obtaining the crystalline propylene-butene-1 copolymer (B) of this invention from the above-mentioned pre-decomposition composition is preferably such that the ratio of the intrinsic viscosity before the decomposition to that after decomposition falls in the range of 1.3 to 3.5. A ratio outside this range is unfavorable because then various problems can occur including an insufficient effect of improving low-temperature heat sealing property, development of fish eyes on the surface of multi-layer film, resulting in poor film appearance or, when the extent of decomposition is too large, generation of smoke and odor during the production of multi-layer film.

It is important that the amount of the copolymer of MW of 10,000 or less in the crystalline propylene-butene-1 copolymer (B) of this invention should be 1.5% by weight or less. When the amount exceeds 1.5% by weight, the low-temperature heat sealing property of the product becomes extremely poor. The amount of said copolymer of MW of 10,000 or less is more preferably 1.0% by weight or less.

In order to obtain a multi-layer film having a good low-temperature heat sealing property as well as good film properties intended in this invention, the crystalline propylene-butene-1 copolymer (B) should satisfy all of the requisites mentioned above.

The pre-decomposition copolymer used in this invention can be prepared by copolymerizing a mixture of propylene and α-olefin using an isospecific Ziegler-Natta catalyst. The catalyst to be used has preferably a high isospecificity.

As to catalysts which can be favorably used, their transition metal catalyst component is a complex solid compound of a magnesium compound with a titanium compound or titanium trichloride having a laminar crystal structure, and their metal component is typically an organo aluminum compound. The catalysts may also contain a known electron donating compound as the third component.

Titanium trichloride which can be used may be those prepared by reducing titanium tetrachloride with various reducing agents. Known reducing agents include metals such as aluminum and titanium, hydrogen, and organo metal compounds. A typical example of titanium trichloride prepared by reduction with metals is a titanium trichloride composition containing aluminum chloride ($TiCl_3$ AA) obtained by reducing titanium tetrachloride with metallic aluminum and then activating the reduction product by grinding it in such apparatuses as a ball mill or a vibrating mill. It is also possible to carry out the grinding in the presence of a compound selected from ether, ketone, ester, aluminum chloride, titanium tetrachloride and the like in order to improve isospecificity, polymerization activity, and/or particle properties.

Titanium trichloride which is more favorable to the object of this invention is the one which is obtained by reducing titanium tetrachloride with an organo aluminum compound and then contacting the resultant titanium trichloride composition with an ether compound and with a halogen compound simultaneously or successively to undergo reaction. Preferred ether compounds are those represented by the general formula $R^1$—O—$R^2$ ($R^1$ and $R^2$ being each an alkyl group of 1 to 18 carbon atoms), particularly di-n-butyl ether and di-t-amyl ether. Halogen compounds are preferably selected from the group consisting of halogens, particularly iodine, interhalogen compounds, particularly iodine trichloride, titanium halide, particularly titanium tetrachloride, and halogenated hydrocarbons, particularly carbon tetrachloride and 1,2-dichloroethane. Preferred organo aluminum compounds are those represented by the general formula $AlR^3_n X_{3-n}$ ($R^3$ being a hydrocarbon radical of 1 to 18 carbon atoms; X being a halogen selected from Cl, Br, and I; and n being a number satisfying $3 \geq n > 1$), particularly diethylaluminum chloride and ethylaluminum sesquichloride. The methods of preparation of such titanium trichloride are described in detail in Japanese Patent Application Kokai (Laid-open) Nos. 34470/72, 11986/79 and 142903/83 and U.S. Pat. No. 4,165,298.

When titanium trichloride having a laminar crystal structure is used as the transition metal compound component it is preferable to use an organo aluminum compound represented by the general formula $AlR^4_m X_{3-m}$ ($R^4$ being a hydrocarbon radical of 1 to 18 carbon atoms; X being a halogen selected from Cl, Br and I; m being a number satisfying $3 \geq m > 0$) as the typical metal compound component. Organo aluminum compounds particularly favorable to the purpose of this invention are those wherein $R^4$ is ethyl or isobutyl group and m satisfies $2.5 \geq m \geq 1.5$. Specific examples thereof include diethylaluminum chloride, diethylaluminum bromide, diethylaluminum iodide, and mixtures thereof with triethylaluminum or ethylaluminum dichloride. When the third component described later is used in combination, organo aluminum compounds in which $3 \geq m \geq 2.5$ or $1.5 \geq m > 0$ may also be favorably used for the purpose of this invention.

The molar ratio of an organo aluminum compound to titanium trichloride may be selected from a wide range of from 1:1 to 1000:1.

The catalyst comprising titanium trichloride and an organo aluminum compound may contain a third component known to the art. As examples of the third component, mention may be made of ε-caprolactum, ester compounds such as methyl methacrylate, ethyl benzoate, and methyl toluylate, phosphorous esters such as triphenyl phosphite and tributyl phosphite, and phosphoric acid derivatives such as hexamethyl phosphoric triamide.

The amount of the third component to be used should be experimentally determined for individual compound because its activity varies from compound to compound. It is, however, generally equimolar or less to the organo aluminum compound.

When a complex solid compound of a magnesium compound with a titanium compound is used as the transition metal solid catalyst component of the catalyst, the typical metal catalyst component to be used is preferably an organo aluminum compound, particularly a compound represented by the general formula $AlR^4_p X_{3-p}$ ($R^4$ being a hydrocarbon radical of 1 to 18 carbon atoms; X being a halogen selected from Cl, Br and I; P satisfying $3 \geq p > 2$). As specific examples, there may be mentioned triethylaluminum, triisobutylaluminum, or a mixture thereof with diethylaluminum chloride or diisobutylaluminum chloride.

Further, the catalyst preferably contains an electron donating compound, particularly an aromatic monocarboxylic acid ester, and/or a silicon compound having a Si—$OR^5$ linkage. A preferably used silicon compound having a Si—$OR^5$ linkage ($R^5$ being a hydrocarbon radical of 1 to 20 carbon atoms) is an alkoxysilane compound represented by the general formula $R^6_a Si(OR^5)_{4-a}$ ($R^5$ and $R^6$ being each a hydrocarbon radical of 1 to 20 carbon atoms; and a being a number satisfying $0 \leq a \leq 3$).

Specific examples of the alkoxysilane compound include tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, and diethyldiethoxysilane. The electron donating compound is preferably used in an amount of 1 mole or less, particularly in the range of 0.05 to 1 mole, relative to one mole of the organo aluminum compound.

The complex solid compound of a magnesium compound with a titanium compound to be used is a so-called "supported catalyst" prepared by bringing either a titanium trichloride containing magnesium chloride obtained by reducing titanium tetrachloride with an organo magnesium compound or a solid magnesium compound with a liquid titanium compound to undergo a reaction. The solid magnesium compound preferably contains an electron donating compound, particularly an aromatic monocarboxylic ester, an aromatic dicarboxylic diester, an ether compound, an alcohol and/or a phenol. The aromatic monocarboxylic ester may also be present at the time of the contact and reaction with the titanium compound.

The complex solid compound of a magnesium compound with a titanium compound mentioned above is described in many references. As to a catalyst favorable to the purpose of this invention, there can be found detail descriptions in Japanese Patent Application Kokai (Laid-open) Nos. 119536/79, 30407/81, 59909/82, 59910/82, 59911/82, 59912/82, 59914/82, 59915/82, 59916/82, 112982/79 and U.S. Pat. Nos. 4,350,802, 4,483,939 and Canadian Patent No. 1,103,390.

The pre-decomposition copolymer can be prepared by copolymerizing a mixture of propylene and α-olefin in a gas or liquid phase in the presence of the above-mentioned catalyst. In a liquid phase copolymerization, the copolymerization may be conducted after dissolving monomers in an inert hydrocarbon solvent such as hexane and heptane, or it may be effected in a liquid phase monomer mixture. The control of the molecular weight is generally and effectively conducted by adding hydrogen to the polymerization system.

Although copolymerization may be effected at any desired temperature and pressure, a temperature in the range of 30° to 80° C. is preferably selected to achieve the object of this invention.

The copolymer of this invention is not necessarily a "random copolymer" in a statistically strict sense, namely a copolymer in which the chain distribution of propylene and α-olefin (which can be determined by $C^{13}$ nuclear magnetic resonance) obey strictly the Bernoullis' statistical rule. It may have a distribution of composition so long as it is in conformity with the definition according to this invention.

The decomposition of the pre-decomposition copolymer can be conducted by known methods of decomposing polypropylene including thermal decomposition. An industrially advantageous method is, for example, to decompose the copolymer while melting and kneading it in an extruder. For efficient decomposition, it is preferable to use a radical initiator. Since odor and discoloration are particularly troublesome in film application, aliphatic organic peroxides are preferably used. As examples of preferred aliphatic organic peroxides, mention may be made of 2,5-dimethyl-2,5-di(tertiarybutyl-peroxy)hexane and 2,5-dimethyl-2,5-di(tertiarybutyl-peroxy)hexene-3. The amount of these organic peroxide to be used is preferably 0.005 to 1% by weight, more preferably 0.2 to 0.08% by weight, relative to the pre-decomposition copolymer. The decomposition temperature is preferably in the range of 180° to 300° C.

The intrinsic viscosity, CXS, and the amount of the component of MW of 10,000 or less in this invention are determined according to the following methods.

(1) Intrinsic Viscosity

Intrinsic viscosity was determined by measuring the viscosity of completely dissolved polymer solution in tetralin at 135° C. in an Ubbelohdes' viscometer in a conventional manner. A suitable antioxidant, for example about 0.2% by weight of 2,6-di-t-butyl-p-cresol, was added to tetralin used as the solvent to prevent the decomposition of polymer during the measuring operation.

(2) CXS (20° C. Xylene Soluble Portion)

One gram of polymer was dissolved in 200 ml of boiling xylene. The resultant solution was gradually cooled to 50° C., then cooled to 20° C. by immersion in ice water with stirring, and allowed to stand for 3 hours to filter off the precipitated polymer. Xylene was evaporated off from the filtrate, and the residue was dried under vacuum at 60° C. to recover a polymer soluble in xylene at 20° C., which was then weighed.

(3) Amount of the Component of MW of 10,000 or Less

This was determined by the use of gel permeation chromatography (GPC) in the following manner.

Determination was conducted on a Model 150-C ALC/GPC (mfd. by Waters Associates, U.S.A.) to which two columns of Shodex ® (a registered trade mark) GPC AD-80M/S (mfd. by Showa Denko K.K.) had been connected and by using 1,2,4-trichlorobenzene containing 0.04% by weight of 2,6-di-t-butyl-p-cresol as the solvent at 140° C. The calibration curve was prepared by using nine kinds of standard polystyrenes ($M_w/M_n = 1.01-1.14$) having different molecular weights ranging from $2.3 \times 10^2$ to $6.2 \times 10^6$ manufactured by Toyo Soda Mfg. Co., Ltd. The amount of the component of MW of 10,000 or less in the polymer is determined by the areametric method from the molecular weight distribution curve thus obtained. Standard Reference Material 706 (polystyrene of $M_w/M_n = 2.1$) available from NBS (National Bureau of Standards, U.S.A.) was subjected to GPC determination in the above-mentioned manner, and was found to contain 0.5% by weight of a component of MW of 10,000 or less.

The compounding ratio of the crystalline propylene-α-olefin copolymer (A) to the crystalline propylene-butene-1 copolymer (B) should be 70 to 95% by weight of the copolymer (A) to 5 to 30% by weight of the copolymer (B), 10 to 25% by weight of the copolymer (B) being preferable. When the proportion of the copolymer (B) is less than 5% by weight, the desired low-temperature heat sealing property cannot be obtained, whereas when it exceeds 30% by weight, the resultant product has deteriorated blocking resistance, scratch resistance and solvent resistance and cannot be used in practice. The method for compounding copolymer (A) and copolymer (B) is not restricted specifically so long as it gives a substantially homogeneous composition.

The multi-layer film thus obtained from a composition containing the crystalline propylene-butene-1 copolymer (B) obtained by decomposition has markedly improved properties as compared with conventional multi-layer film comprising a composition using conventional copolymers. Thus, the multi-layer film according to this invention has a markedly improved low-temperature heat sealing property as compared with multi-layer film comprising a composition using conventional copolymer having the same butene-1 content, intrinsic viscosity, melt flow index and heat of fusion (wherein the molecular weight has been controlled by a molecular weight modifier added in copolymerization).

The polypropylene multi-layer film according to this invention is suited to the use as packaging film in the field of packaging, particularly food packaging, by virtue of its excellent low-temperature heat sealing property, scratch resistance, blocking resistance, solvent resistance and food hygienic properties.

The composition and the film thereof according to this invention can contain, as required, known additives including antioxidants, ultraviolet absorbers, lubricants, antiblocking agents, antistatic agents, anticlouding agents and nucleating agents.

The polypropylene multi-layer film of this invention can be produced, for example, in the following methods.

(1) Crystalline polypropylene base material and the above-mentioned composition are laminated by coextrusion, and the resultant film is stretched uniaxially or biaxially either separately or simultaneously.

(2) Crystalline polypropylene base material is extruded in molten state and uniaxially stretched in either longitudinal or transverse direction, and the above-mentioned composition is laminated thereon either in an extruded molten form or in a solidified film form, and the laminated film is further stretched in a different direction.

The stretching of the crystalline polypropylene substrate layer of the polypropylene multi-layer film according to this invention is preferably conducted in a draw ratio in one direction within the range of 3 to 20, more preferably 4 to 10.

The polypropylene multi-layer film of this invention can be subjected to a surface treatment such as corona discharge treatment or flame treatment in an industrially customary manner.

This invention will be further illustrated below with reference to Comparative Examples and Examples to be more clearly understood. However, this invention is not limited to these Examples. The characteristic values in the following Examples were determined according to the methods described below.

(1) Haze

Haze was determined according to ASTM D 2457.

(2) Heat Sealing Property (Temperature)

Two portions of the laminated layer of the low-temperature heat sealing composition of the multi-layer film to be tested were superposed face to face, and pressure-bonded under a load of 2 kg/cm$^2$ for 2 seconds by means of a heat sealer heated at a prescribed temperature. The resultant film sealed in 25 mm width was allowed to stand overnight and subjected to a peeling test. The heat sealing temperature was defined as the temperature of the heat sealer at which the peeling resistance reached 250 g/25 mm in the peeling test conducted at a temperature of 23° C., a peeling velocity of 200 mm/minute and a peeling angle of 180°.

(3) Blocking Resistance

Two rectangular 30×120 mm test pieces were superposed such that reactangular 30×40 mm portions of the side of the pieces having the composition (B) laminated thereon face to each other, then a load of 500 g was placed thereon, and the test pieces were conditioned at 60° C. for 3 hours. Afterwards, they were allowed to stand in an atmosphere of 23° C. and 50% R.H. for 1 hour and subjected to shear tensile test at a velocity of 200 mm/minute to determine the strength necessary for peeling of the specimen. The less the strength determined, the better the blocking resistance.

(4) Scratch Resistance

On the side of a specimen laminated with the composition, was placed 100 cc. of No. A sea sand (15 to 25 mesh) in an area of 150 mm square. The whole was subjected to lateral vibration for 15 seconds by means of a rocking vibrator, and the resultant haze of the film was determined. The smaller the difference (ΔHz) of the haze thus determined from that before the test, the scratch resistance is judged the better.

(5) Solvent Resistance

The amount of 25° C. xylene soluble portion was determined according to FDA 177, 1520. Solvent resistance was judged good when the said amount was less than 30%, and poor when the amount was 30% or more.

(6) Melting Point

Ten milligrams of a specimen was enclosed in a sample holder for solid samples, then heated at 200° C. for 2 minutes, and allowed to cool on a laboratory table at room temperature. After allowed to stand in this condition for 1 to 2 hours, the specimen was tested on a differential scanning calorimeter (DSC, mfd. by Perkin Elmer Co.) in nitrogen atmosphere at a temperature-increasing rate of 10° C./minute over a temperature range of 20° to 180° C. The peak temperature showing the largest heat absorption in the melting diagram thus obtained was defined as No. 1 Tm, and that showing the second largest heat absorption as No. 2 Tm.

(7) Heat of Fusion

In the melting diagram obtained in (6) above, the line of specific heat between 170° and 180° C. was extraporated linearly to the low temperature region and used as the base line to determine the melting area in a conventional method. As determined by this method, a crystalline polypropylene resin [Sumitomo Noblen ® (a registered trade mark) FS 2011D mfd. by Sumitomo Chem. Co. Ltd.] was found to have a heat of fusion of 91 Joule/g.

(8) Boiling N-heptane Isoluble Portion (BHIS)

This was determined according to the method described in U.S. Pat. No. 4,168,361.

EXAMPLE 1

(1) Polymerization of Pre-decomposition Copolymer

Into a stainless steel autoclave of 100 l internal volume equipped with a stirrer, the atmosphere in which had been replaced thoroughly with nitrogen and propylene, was charged 50 l of purified hexane of technical grade, and the temperature was raised up to 50° C. Then, 2.3 kg of propylene and 7.5 kg of butene-1 were charged into the autoclave, and further hydrogen was introduced thereinto to a hydrogen partial pressure in the gas phase of 0.05 kg/cm$^2$G. Then, 30 g of diethylaluminum chloride and 2.5 g of titanium trichloride catalyst were charged thereinto. The titanium trichloride catalyst used was prepared according to the method described in Japanese Patent Application Kokai (Laid-open) No. 228504/85. Copolymerization was carried out for 2 hours while propylene, butene-1, and hydrogen were being fed continuously so as to maintain the hydrogen concentration in the gas phase constant, and to give a total pressure of 3 kg/cm$^2$G and a butene-1 content in the gas phase of 47% by weight. Thereafter, the monomers were purged, and the content of the autoclave was transferred to a vessel equipped with a stirrer, into which then 1 l of n-butanol was charged and the resultant mixture was stirred at 50° to 60° C. for 1 hour. Then, 50 l of water was introduced into the system, the resultant mixture was stirred at 50° to 60° C. for 30 minutes, allowed to stand for 5 minutes, and the aqueous phase was separated off. This procedure was repeated two times. Then, Irganox ® (a registered trade mark) 1076 (mfd. by Ciba Geigy Co.) was added to the organic phase in an amount of about 100 ppm relative to the amount of polymer, and the organic phase was subjected to steam stripping using a steam of 100° C. The polymer portion was taken out and dried overnight in a vacuum dryer at 100° C. to obtain copolymer in solid form. The procedure was repeated two times to obtain 5 kg of copolymer. The solid copolymer was comminuted in a pulverizer into powder having a size passing through a hole of 3 mm in diameter.

The copolymer thus obtained had a butene-1 content of 34% by weight, an intrinsic viscosity of 3.3 dl/g and 20° C. xylene soluble portion (CXS) of 81% by weight.

(2) Preparation of Crystalline Propylene-butene-1 Copolymer (B)

Into 100 parts by weight of the pulverized copolymer obtained in (1) above, were mixed 0.1 part by weight of Sumilyzer ® (a registered trade mark) BHT (mfd. by Sumitomo Chemical Co., Ltd.), 0.1 part by weight of Irganox ® (a registered trade mark) 1010 (mfd. by Ciba Geigy Co.), 0.2 part by weight of calcium stearate and, as a decomposing agent, 0.04 part by weight of 2,5-dimethyl-2,5-di-t-butylperoxyhexane. The mixture obtained was melt-extruded through a single-screw extruder of 40 mm diameter heated at 220° C., and the extruded strand was cut to obtain pellets. The residence time of the copolymer in the extruder was about 1.5 minutes.

The pellets thus obtained had an intrinsic viscosity of 1.60 dl/g, a melt flow index of 9.5 g/10 minutes, an amount of the copolymer of MW of 10,000 or less of 0.2% by weight, No. 1 Tm of 102° C., No. 2 Tm of 150° C., and BHIS of 16% by weight.

(3) Preparation of the Composition

Into a mixture comprising 80% by weight of the powder of a crystalline propylene-ethylene copolymer (I) having an ethylene content of 3.1% by weight and an intrinsic viscosity of 1.70 dl/g, used as the crystalline propylene-α-olefin copolymer (A), and 20% by weight of the above-mentioned pellets of crystalline propylene-butene-1 copolymer (B), were added 0.1 part by weight of Sumilizer ® (a registered trade mark) BHT (mfd. by Sumitomo Chemical Co., Ltd.), 0.1 part by weight of Syloid ® (a registered trade mark) 244 (mfd. by Fuji-Davidson Co.), 0.1 part by weight of erucic amide, and 0.05 part by weight of calcium stearate. The whole was mixed in a Henschel mixer and granulated through a single-screw extruder of 40 mm diameter to give pellets.

(4) Preparation of Multi-layer Film

A crystalline polypropylene resin [Sumitomo Noblen ® (a registered trade mark) FS 2011D, melt index 2.6, mfd. by Sumitomo Chemical Co., Ltd.] was melt-extruded through a sheet extruder of 65 mm bore diameter at a resin temperature of 280° C., and cooled with a cooling roll of 20° C. to solidify into a cooled sheet of 0.5 mm thickness. Then, the above-mentioned composition was melt-extruded through an extrusion laminator of 40 mm diameter set at a resin temperature of 280° C. and laminated in a thickness of 50 μm on the one side of the above-mentioned crystalline polypropylene sheet. The laminate thus obtained was subjected to simultaneous biaxial stretching on a small biaxial stretching machine at a stretching temperature of 150° C. and a draw ratio of 5 both in the longitudinal and the transverse direction to obtain laminated film of about 22 μm thickness.

The results of determination of the properties of the film obtained are shown in Table 1.

EXAMPLE 2

(1) Polymerization of Pre-decomposition Copolymer

The procedure in Example 1 was repeated except that the concentrations of butene-1 and propylene and the partial pressure of hydrogen were changed, to obtain a pre-decomposition copolymer having a butene-1 content of 27% by weight, an intrinsic viscosity of 5.4 dl/g, and CXS of 45% by weight.

(2) Preparation of Crystalline Propylene-butene-1 Copolymer (B)

Crystalline propylene-butene-1 copolymer (B) was prepared in the same manner as in Example 1 except that the amount of the decomposing agent added was changed. The copolymer (B) obtained had an intrinsic viscosity of 1.56 dl/g, an amount of the component of MW of 10,000 or less of 0.5% by weight, No. 1 Tm of 116° C., No. 2 Tm of 149° C., and BHIS of 13% by weight.

(3) Preparation of the Composition

The composition was granulated into pellets in the same manner as in Example 1 except that the amount of the crystalline propylene-ethylene copolymer (I) powder was changed to 75% by weight, the crystalline propylene-butene-1 copolymer (B) was replaced by the one obtained above and its compounded amount was changed to 25% by weight.

(4) Preparation of Multi-layer Film

The same method was used as that in Example 1.

The results of determination of the properties of the film obtained are shown together in Table 1.

EXAMPLE 3

A pre-decomposition copolymer having a butene-1 content of 37% by weight, an intrinsic viscosity of 2.75 dl/g and CXS of 60% by weight was obtained in the same manner as in Example 1 except that there was used a system which comprised a catalyst system consisting of titanium trichloride manufactured by Marubeni-Solvay Co. according to a method described in Japanese Patent Application Kokai (Laid-open) No. 34478/72 and diethylaluminum chloride, and ϵ- caprolactam added thereto in a porportion of 0.2% by mole relative to diethylaluminum chloride, and the butene-1 concentration, the propylene concentration, and the hydrogen partial pressure were changed.

Then, copolymer (B), the composition, and multi-layer film were prepared in the same manner as in Example 1 except that the amount of the decomposing agent added was changed.

The copolymer (B) obtained above had an intrinsic viscosity of 2.07 dl/g, an amount of the copolymer of MW of 10,000 or less of 0.8% by weight, No. 1 Tm of 100° C., No. 2 Tm of 139° C., and BHIS of 13% by weight.

The results of determination of the properties of the film obtained are shown together in Table 1.

EXAMPLE 4

(1) Polymerization of Pre-decomposition Copolymer

A 2l separable flask was fitted with a stirrer, a thermometer, a dropping funnel, and a reflex condenser, and the interior was evacuated and then replaced with nitrogen. One liter of dried n-heptane was placed in the flask, and a gas mixture consisting of 68% by mole by propylene and 32% by mole of butene-1 was passed therethrough at a rate of 5.5 Nl/minute while the temperature was kept at 40° C. Then, 10 m mole of diethylaluminum chloride and further 0.3 g of titanium trichloride used in Example 1 were introduced into the flask to initiate polymerization. Polymerization was conducted for 4 hours with stirring while the above-mentioned gas mixture was passed continuously. Then, the reaction was stopped by addition of 30 ml of butanol. The reaction product was washed thoroughly with butanol, and then thrown into a large amount of methanol to precipitate copolymer, and the precipitate was dried. The above procedure was repeated four times to obtain 95 g of copolymer. The copolymer was comminuted into powder in the same manner as in Example 1.

The copolymer thus obtained had a butene-1 content of 38% by weight, an intrinsic viscosity of 3.6 dl/g, and CXS of 84% by weight.

(2) Preparation of Crystalline Propylene-butene-1 Copolymer (B)

Into 100 parts by weight of the pulverized copolymer obtained in (1) above, were mixed 0.1 part by weight of Sumilizer ® (a registered trade mark) BHT, 0.1 part by weight of Irganox ® (a registered trade mark) 1010 (mfd. by Ciba Geigy Co.), 0.2 part by weight of calcium stearate, and 0.1 part by weight of the decomposing agent used in Example 1. The mixture was kneaded for 5 minutes in a small kneader heated at 210° C. The resultant product had an intrinsic viscosity of 1.42 dl/g, an amount of the copolymer of MW of 10,000 or less of 0.8% by weight, No. 1 Tm of 89° C., No. 2 Tm of 140° C., and BHIS of 8.4% by weight.

(3) Preparation of the Composition

To a mixture comprising 85% by weight of the powder of crystalline propylene-ethylene copolymer (II) having an ethylene content of 4.7% by weight and an intrinsic viscosity of 1.64 dl/g, serving as the crystalline propylene-α-olefin copolymer (A), and 15% by weight of the above-mentioned copolymer (B), were added 0.1 part by weight of Sumilizer ® (a registered trade mark) BHT, 0.2 part by weight of Syloid ® (a registered trade mark) 244, 0.25 part by weight of oleic amide, and 0.05 part by weight of calcium stearate, and the mixture was kneaded for 5 minutes in a small kneader heated at 190° C.

(4) Preparation of Multi-layer Film

A crystalline polypropylene resin [Sumitomo Noblen ® (a registered trade mark) FS 2011D] and the above-mentioned composition were each heat-formed in a press at 230° C. for 10 minutes and then cooled to obtain a 500 μm thick sheet from the former and a 100 μthick sheet from the latter. The two sheets were superposed on each other and pressed in the same manner as above to obtain a laminated sheet of about 580 μm thickness. The laminate thus obtained was subjected to simultaneous biaxial stretching on a small biaxial stretching machine at a stretching temperature of 150° C. and a draw ratio of 5 both in the longitudinal and the transverse direction to obtain multi-layer film of about 23 μm thickness. The results of determination of the properties of the film obtained are shown together in Table 1.

COMPARATIVE EXAMPLE 1

A composition was prepared and multi-layer film was prepared therefrom each in the same manner as in Example 1 except that 100% by weight of the powder of the crystalline propylene-ethylene copolymer (I) having an ethylene content of 3.1% by weight and an intrinsic viscosity of 1.70 dl/g was used in preparing the composition.

The results of determination of the properties of the film obtained are shown together in Table 1.

COMPARATIVE EXAMPLE 2

Preparation of Pre-decomposition Copolymer

The procedure in Example 1 was repeated except that the propylene concentration, the butene-1 concentration, and the hydrogen partial pressure were changed. The catalyst system used was the same as that in Example 1. A copolymer powder having a butene-1 content of 35% by weight, an intrinsic viscosity of 1.13 dl/g, and CXS of 73% by weight was obtained. The copolymer powder showed an amount of the component of MW of 10,000 or less of 4.7% by weight, BHIS of 3.2% by weight, a heat of fusion of 38 Joule/g, No. 1 Tm of 104° C., and No. 2 Tm of 140° C.

The copolymer powder was then used without being decomposed, to prepare a composition and multi-layer film in the same manner as in Example 1.

The results of determination of the properties of the film obtained are shown together in Table 1.

COMPARATIVE EXAMPLE 3

The same catalyst system as that in Example 1 was used and the procedure in Example 1 was repeated except that the butene-1 concentration, the propylene concentration, and the hydrogen partial pressure were changed, to obtain a copolymer powder having a butene-1 content of 28% by weight, a intrinsic viscosity of 1.58 dl/g, and CXS of 42% by weight. The copolymer powder showed an amount of the component of MW of 10,000 or less of 2.0% by weight, BHIS of 16% by weight, a heat of fusion of 51 Joule/g, No. 1 Tm of 124° C. and No. 2 Tm of 143° C. The copolymer was then used without being decomposed, to prepare a composition and multi-layer film therefrom in the same manner as in Example 1.

The results of determination of the properties of the film obtained are shown together in Table 1.

COMPARATIVE EXAMPLE 4

A composition was prepared in the same manner as described in the section of "preparation of composition" in Example 4 but by using 100% by weight of the powder of the crystalline propylene-ethylene copolymer (II) used in Example 4, and multi-layer film was prepared therefrom in the same manner as described in the section of "preparation of multi-layer film" in Example 4.

The results of determination of the properties of the film obtained are shown together in Table 1.

TABLE 1

| Item | | | Example 1 | Example 2 | Example 3 | Example 4 | Comp. Example 1 | Comp. Example 2 | Comp. Example 3 | Comp. Example 4 |
|---|---|---|---|---|---|---|---|---|---|---|
| Property of pre-decomposition copolymer | Butene-1 content | Wt. % | 34 | 27 | 37 | 38 | — | 35 | 28 | — |
| | Intrinsic viscosity | dl/g | 3.3 | 5.4 | 2.75 | 3.6 | — | 1.13 | 1.58 | — |
| | CXS | Wt. % | 81 | 45 | 60 | 84 | — | 73 | 42 | — |
| Property of copolymer (B) | Intrinsic viscosity | dl/g | 1.60 | 1.56 | 2.07 | 1.42 | — | 1.13 | 1.58 | — |
| | MW < 10,000 | Wt. % | 0.2 | 0.5 | 0.8 | 0.8 | — | 4.7 | 2.0 | — |
| | BHIS | " | 16 | 13 | 13 | 8.4 | — | 3.2 | 16 | — |
| | Heat of fusion | Joule/g | 35 | 51 | 37 | 24 | — | 38 | 51 | — |
| | No. 1 Tm | °C. | 102 | 116 | 100 | 89 | — | 104 | 124 | — |
| | No. 2 Tm | °C. | 150 | 149 | 139 | 140 | — | 140 | 143 | — |
| Copolymer (A) | $C_3'-C_2'$ (I) | Wt. % | 80 | 75 | 80 | — | 100 | 80 | 80 | — |
| | $C_3'-C_2'$ (II) | " | — | — | — | 85 | — | — | — | 100 |
| Copolymer (B) | $C_3'-C_4'$ | " | 20 | 25 | 20 | 15 | — | 20 | 20 | — |
| Heat sealing property | Heat seal strength | 70° C. g/25 mm | <10 | <10 | <10 | 20 | — | — | — | — |
| | | 80° C. " | 40 | 28 | 30 | 54 | — | — | — | — |
| | | 90° C. " | 260 | 110 | 110 | 190 | — | — | 10 | — |
| | | 100° C. " | >400 | >400 | >400 | >400 | — | 15 | 70 | — |
| | | 110° C. " | — | — | — | — | — | 40 | 200 | — |
| | | 120° C. " | — | — | — | — | — | 110 | >400 | 16 |
| | | 130° C. " | — | — | — | — | 28 | 310 | — | 250 |
| | | 140° C. " | — | — | — | — | 350 | — | — | >400 |
| | Heat sealing temp. | °C. | 90 | 96 | 96 | 92 | 139 | 128 | 115 | 130 |
| Film property | Haze | % | 1.0 | 1.2 | 0.8 | 0.9 | 0.7 | 1.1 | 0.9 | 0.9 |
| | Blocking resistance | kg/12 cm² | 0.42 | 0.35 | 0.31 | 0.43 | 0.10 | 0.35 | 0.19 | 0.25 |
| | Scratch resistance | % | 1.7 | 2.2 | 2.1 | 2.2 | 1.6 | 2.1 | 2.2 | 2.4 |
| | Solvent resistance | % | ≦30% | ≦30% | ≦30% | ≦30% | ≦30% | ≦30% | ≦30% | ≦30% |

As shown in Table 1, the multi-layer film of this invention (Examples 1 to 4) is quite satisfactory in practice in haze, blocking resistance, scratch resistance, and solvent resistance, and shows a low-temperature heat sealing property of markedly improved level. It can be seen that multi-layer film (Comparative Examples 1 and 4) formed of conventional, well-known propylene-ethylene copolymer alone has a very poor low-temperature heat sealing property. Further, it is revealed that, even an improved version of said prior art method, namely a method wherein copolymer (B) used is a polymer before decomposition, gives multi-layer film (Comparative Examples 2 to 3) which is markedly poor in low-temperature heat sealing property as compared with the film according to this invention.

EXAMPLES 5 AND 6, AND COMPARATIVE EXAMPLES 5 AND 6

A composition and multi-layer film were prepared in the same manner as described in Example 1 except that a terpolymer (III) having an ethylene content of 2.2% by weight, a butene-1 content of 5.7% by weight, and an intrinsic viscosity of 1.73 dl/g, and a propylene-butene-1 copolymer (IV) having a butene-1 content of 13% by weight and an intrinsic viscosity of 1.85 dl/g were used as the crystalline propylene-α-olefin copolymer (A), and the additives described in Example 4 were mixed into a composition comprising 80% by weight of said copolymer (A) and 20% by weight of the copolymer (B) used in Example 1 (Examples 5 to 6). Separately, multi-layer film was prepared by using the above-mentioned crystalline propylene-ethylene-butene-1 copolymer (III) or propylene-butene-1 copolymer (IV) (Comparative Example 4 and 5).

The results of determination of the properties of the film obtained are shown in Table 2.

EXAMPLE 7

A composition and multi-layer film were prepared in the same manner as described in Example 1 except that the additives described in Example 4 were added into a composition comprising 90% by weight of a propylene-butene-1 copolymer (V) having a butene-1 content of 18% by weight and an intrinsic viscosity of 1.87 dl/g, used as the propylene-α-olefin copolymer (A), and 10% by weight of the copolymer (B) used in Example 1. The results of determination of the properties of the film obtained are shown together in Table 2.

COMPARATIVE EXAMPLE 7

A composition and multi-layer film were prepared in the same manner as in Example 5 except for using a propylene-ethylene copolymer (VI) having an ethylene content of 0.6% by weight and an intrinsic viscosity of 1.65 dl/g as the crystalline propylene-α-olefin copolymer (A). The results of determination of the properties of the film obtained are shown together in Table 2.

TABLE 2

| Item | | | Example 5 | Example 6 | Example 7 | Comp. Example 5 | Comp. Example 6 | Comp. Example 7 |
|---|---|---|---|---|---|---|---|---|
| Property of pre-decomposition copolymer | Butene-1 content | Wt. % | 34 | 34 | 34 | — | — | 34 |
| | Intrinsic viscosity | dl/g | 3.3 | 3.3 | 3.3 | — | — | 3.3 |
| | CXS | Wt. % | 81 | 81 | 81 | — | — | 81 |
| Property of copolymer (B) after | Intrinsic viscosity | dl/g | 1.60 | 1.60 | 1.60 | — | — | 1.60 |
| | MW < 10,000 | Wt. % | 0.2 | 0.2 | 0.2 | — | — | 0.2 |
| | BHIS | " | 16 | 16 | 16 | — | — | 16 |
| | Heat of fusion | Joule/g | 35 | 35 | 35 | — | — | 35 |

TABLE 2-continued

|  |  |  | | Example or Comparative Example | | | | | |
|---|---|---|---|---|---|---|---|---|---|
| Item | | | | Example 5 | Example 6 | Example 7 | Comp. Example 5 | Comp. Example 6 | Comp. Example 7 |
| decomposition | No. 1 Tm | | °C. | 102 | 102 | 102 | — | — | 102 |
|  | No. 2 Tm | | °C. | 150 | 150 | 150 | — | — | 150 |
| Copolymer (A) | $C_3'$-$C_2'$-$C_4'$ (III) | | Wt. % | 80 | — | — | 100 | 0 | 0 |
|  | $C_3'$-$C_4'$ (IV) | | " | — | 80 | — | — | 100 | — |
|  | $C_3'$-$C_4'$ (V) | | " | — | — | 90 | — | — | — |
|  | $C_3'$-$C_2'$ (VI) | | " | — | — | — | — | — | 80 |
| Copolymer (B) | $C_3'$-$C_2'$ (B) | | " | 20 | 20 | 10 | — | — | 20 |
| Heat sealing | Heat | 70° C. | g/25 mm | <10 | 20 | 20 | — | — | — |
| property | seal | 80° C. | " | 51 | 140 | 55 | — | — | — |
|  | strength | 90° C. | " | 280 | 350 | 300 | — | — | — |
|  |  | 100° C. | " | >400 | >400 | >400 | — | — | — |
|  |  | 110° C. | " | — | — | — | — | <10 | — |
|  |  | 120° C. | " | — | — | — | <10 | 100 | — |
|  |  | 130° C. | " | — | — | — | 70 | >400 | 10 |
|  |  | 140° C. | " | — | — | — | >400 | — | 50 |
|  | Heat sealing temp. | | °C. | 88 | 85 | 88 | 135 | 125 | >140 |
| Film | Haze | | % | 1.3 | 1.2 | 1.2 | 1.1 | 1.0 | 1.9 |
| property | Blocking resistance | | kg/12 cm² | 0.43 | 0.42 | 0.35 | 0.35 | 0.45 | 0.21 |
|  | Scratch resistance | | % | 2.0 | 2.2 | 2.0 | 1.8 | 1.7 | 1.9 |
|  | Solvent resistance | | % | ≦30% | ≦30% | ≦30% | ≦30% | ≦30% | ≦30% |

EXAMPLES 8 AND 9, AND COMPARATIVE EXAMPLE 8

Compositions and multi-layer film were prepared in the same manner as in Example 1 except that a crystalline propylene-ethylene copolymer (A) having an ethylene content of 4.7% by weight and an intrinsic viscosity of 1.64 dl/g, and the crystalline propylene-butene-1 copolymer (B) used in Example 1 were employed and the compounding ratio of (A) to (B) was changed.

The results of determination of the properties of the film obtained are shown in Table 3.

COMPARATIVE EXAMPLE 9

Polymerization was conducted in the same manner as in Example 1 except that diethylaluminum chloride and titanium trichloride employed in Example 3 were used and the butene-1 concentration, the propylene concentration, and the hydrogen partial pressure were changed, to obtain a pre-decomposition copolymer having a butene-1 content of 27% by weight, an intrinsic viscosity of 2.01 dl/g and CXS of 31% by weight. Copolymer (B) was prepared in the same manner as in Example 1 except that the amount of the decomposing agent incorporated was changed. The copolymer thus obtained had an intrinsic viscosity of 1.51 dl/g, a melt flow index of 13 g/10 minutes, an amount of the copolymer of MW of 10,000 or less of 2.1% by weight, No. 1 Tm of 125° C., No. 2 Tm of 143° C., and BHIS of 14% by weight.

Preparation of the composition and that of multi-layer film were conducted in the same manner as in Example 1.

The results of determination of the properties of the film obtained are shown together in Table 3.

COMPARATIVE EXAMPLE 10

Polymerization was carried out in the same method as in Example 4 except that a supported catalyst prepared according to the method described in Japanese Patent Application Kokai (Laid-open) No. 59916/82, triethylaluminum and, as the third component, 0.22 mole of methyl toluylate per mole of triethylaluminum were used, the concentrations of butene-1 and propylene were changed, polymerization temperature was 50° C., and polymerization time was 1 hour, to obtain a copolymer having a butene-1 content of 35% by weight, an intrinsic viscosity of 2.33 dl/g, and CXS of 60% by weight. The copolymer thus obtained showed an amount of the copolymer of MW of 10,000 or less of 2.5% by weight, BHIS of 0.5% by weight, a heat of fusion of 31 Joule/g, and No. 1 Tm of 89° C.

Preparation of the composition was carried out in the same manner as in Example 4 but by adding the same decomposing agent as that used in Example 1 into a mixture of 80% by weight of the crystalline propylene-ethylene copolymer (I) used in Example 1 and 20% by weight of the above-mentioned copolymer (B). Preparation of multi-layer film was also carried out in the same manner as in Example 4.

The results of determination of the properties of the film obtained are shown together in Table 3.

COMPARATIVE EXAMPLE 11

Polymerization was carried out in the same manner as in Example 4 except that the butene-1 concentration and the propylene concentration were changed and the polymerization temperature and the polymerization time were altered to 60° C. and 3 hours respectively, to obtain a copolymer having a butene-1 content of 49% by weight, an intrinsic viscosity of 1.78 dl/g, and CXS of 85% by weight. The copolymer showed an amount of the copolymer of MW of 10,000 or less of 4.3% by weight, BHIS of 5.5% by weight, No. 1 Tm of 75° C. and No. 2 Tm of 130° C.

Preparation of the composition and that of multi-layer film were conducted in the same manner as in comparative Example 8.

The results of determination of the properties of the film obtained are shown together in Table 3.

TABLE 3

| Item | | | Example 8 | Example 9 | Comp. Example 8 | Comp. Example 9 | Comp. Example 10 | Comp. Example 11 |
|---|---|---|---|---|---|---|---|---|
| Property of pre-decomposition copolymer | Butene-1 content | Wt. % | 34 | 34 | 34 | 27 | 35 | 49 |
| | Intrinsic viscosity | dl/g | 3.3 | 3.3 | 3.3 | 2.01 | 2.33 | 1.78 |
| | CXS | Wt. % | 81 | 81 | 81 | 31 | 60 | 85 |
| Compolymer (B) after decomposition | Intrinsic viscosity | dl/g | 1.60 | 1.60 | 1.60 | 1.51 | 2.33 | 1.78 |
| | MW < 10,000 | Wt. % | 0.2 | 0.2 | 0.2 | 2.1 | 2.5 | 4.3 |
| | BHIS | " | 16 | 16 | 16 | 14 | 0.5 | 5.5 |
| | Heat of fusion | Joule/g | 35 | 35 | 35 | 52 | 31 | 28 |
| | No. 1 Tm | °C. | 102 | 102 | 102 | 125 | 89 | 75 |
| | No. 2 Tm | °C. | 150 | 150 | 150 | 143 | — | 130 |
| Copolymer (A) | $C_3'-C_2'$ (I) | Wt. % | — | — | — | 80 | 80 | 80 |
| | $C_3'-C_2'$ (II) | " | 90 | 75 | 60 | — | — | — |
| Copolymer (B) | $C_3'-C_4'$ (B) | " | 10 | 25 | 40 | 20 | 20 | 20 |
| Heat sealing property | Heat seal strength 70° C. | g/25 mm | — | 100 | 250 | — | — | — |
| | 80° C. | " | 25 | >400 | >400 | — | — | — |
| | 90° C. | " | 120 | — | — | 21 | — | — |
| | 100° C. | " | 380 | — | — | 60 | 37 | 55 |
| | 110° C. | " | >400 | — | — | 180 | 95 | 170 |
| | 120° C. | " | — | — | — | >400 | 310 | 370 |
| | 130° C. | " | — | — | — | — | >400 | >400 |
| | 140° C. | " | — | — | — | — | — | — |
| | Heat sealing temp. | °C. | 97 | 75 | 70 | 115 | 118 | 114 |
| Film property | Haze | % | 0.9 | 0.8 | 0.7 | 1.0 | 1.2 | 3.3 |
| | Blocking resistance | kg/12 cm$^2$ | 0.37 | 0.49 | 0.91 | 0.40 | 0.37 | 1.15 |
| | Scratch resistance | % | 2.1 | 2.9 | 3.9 | 1.9 | 2.1 | 4.5 |
| | Solvent resistance | % | ≦30% | ≦30% | ≧30% | ≦30% | ≦30% | ≦30% |

Tables 2 and 3 reveal that multi-layer film according to this invention (Examples 5 to 8) keeps good balance between low-temperature heat sealing property on one hand and haze, scratch resistance and so forth on the other hand, whereas in Comparative Examples the two are in poor balance. That is, Comparative Examples 5 and 6, multi-layer films formed of a prior art propylene-ethylene-butene-1 terpolymer or propylene-butene-1 copolymer, give a poor low-temperature heat sealing property. Comparative Example 7 also gives a poor low-temperature heat sealing property because a propylene-ethylene copolymer of a small ethylene content (0.6% by weight) has been used therein as the copolymer (A). The multi-layer film of Comparative Example 8 has a good low-temperature heat sealing property, but is poor in blocking resistance, scratch resistance and solvent resistance because the amount of the copolymer (B) compounded is large. Comparative Examples 9 and 10 give an inferior low-temperature heat sealing property because a pre-decomposition copolymer having an intrinsic viscosity of 2.01 dl/g and 2.33 dl/g, respectively, has been used therein.

Comparative Example 11 gives a product which is poor both in the low-temperature heat sealing property and the film property because a pre-decomposition copolymer having a butene-1 content of 49% by weight has been used therein.

As described in the foregoing, multi-layer film can be provided according to this invention which has extremely well balanced properties, namely excellent low-temperature heat sealing property, scratch resistance, blocking resistance, solvent resistance and so forth as compared with prior art polypropylene multi-layer film.

What is claimed is:

1. A polypropylene multi-layer film which comprises a substrate layer formed of crystalline polypropylene and a compositon laminated on at least one side of said substrate layer, said composition comprising:

(a) 70 to 95% by weight of a crystalline propylene-ethylene copolymer having an ethylene content of 1.5 to 6.0% by weight or a crystalline propylene ethylene-butene-1 copolymer or a crystalline propylene-butene-1 copolymer having a propylene content of 80 to 98% by weight, a butene-1 content of 2 to 20% by weight, and an ethylene contend of 0 to 5% by weight, and (b) 5 to 30% by weight of a crystalline propylene-butene-1 copolymer containing 1.5% by weight or less of a copolymer having a molecular weight calculated in terms of polystyrene of 10,000 or less as determined by GPC which is a copolymer obtained by decomposing a crystalline propylene-butene-1 copolymer having a butene-1 content of 25 to 45% by weight, an intrinsic viscosity of 2.5 dl/g or more as determined in tetralin at 135° C., and a proportion of 35% by weight or more of copolymer soluble in xylene at 20° C.

2. A polypropylene multi-layer film according to claim 1, wherein the crystalline polypropylene forming the substrate layer is solid at ordinary conditions, contains at least 80% by weight of a boiling n-heptane insoluble poriton, has an intrinsic viscosity of 1.3 to 4.2 dl/g, and contains at least 95% by weight of propylene in the polymer chain.

3. A polypropylene multi-layer film according to claim 2, wherein the crystalline polypropylene forming the substrate layer is a copolymer containing 5% by weight or less of ethylene and/or butene-1.

4. A polypropylene multi-layer film according to claim 1, wherein the crystalline propylene-ethylene copolymer (A) has an ethylene content of 2.5 to 5.5% by weight.

5. A polypropylene multi-layer film according to claim 1, wherein the crystalline propylene-ethylene-butene-1 copolymer (A) has a propylene content of 85 to 98% by weight, an ethylene content of 0 to 4% by weight, and a butene-1 content of 2 to 15% by weight.

6. A polypropylene multi-layer film according to claim 5, wherein the crystalline propylene-ethylenebutene-1 copolymer (A) has an ethylene content of 1.0 to 3.5% by weight and a butene-1 content of 2.5 to 9.0% by weight.

7. A polypropylene multi-layer film according to claim 5, wherein the crystalline propylene-ethylene-butene-1 copolymer (A) has a butene-1 content of 5 to 15% by weight.

8. A polypropylene multi-layer film according to claim 1, wherein the crystalline propylene-butene-1 copolymer (B) before decomposition has a butene-1 content of 27 to 40% by weight.

9. A polypropylene multi-layer film according to claim 1, wherein the crystalline propylene-butene-1 copolymer (B) before decomposition has an intrinsic viscosity of 2.7 to 5.5 dl/g.

10. A polypropylene multi-layer film according to claim 1, wherein the ratio of the intrinsic viscosity of the crystalline propylene-butene-1 copolymer (B) before decomposition to that after decomposition is 1.3 to 3.5.

11. A polypropylene multi-layer film according to claim 1, wherein the amount of the copolymer of a molecular weight of 10,000 or less in the crystalline propylene-butene-1 copolymer (B) is 1.0% by weight or less.

* * * * *